(12) United States Patent
Shirakawa et al.

(10) Patent No.: US 7,194,746 B2
(45) Date of Patent: Mar. 20, 2007

(54) TRAY DEVICE MECHANISM FOR OPTICAL DISC APPARATUS

(75) Inventors: Tomohiro Shirakawa, Osaka (JP); Hiroyuki Arase, Osaka (JP); Tetsuo Nishidate, Osaka (JP); Takeshi Kurita, Osaka (JP); Masaharu Shibata, Osaka (JP); Hideki Kume, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 415 days.

(21) Appl. No.: 10/808,569

(22) Filed: Mar. 25, 2004

(65) Prior Publication Data
US 2004/0190392 A1  Sep. 30, 2004

(30) Foreign Application Priority Data
Mar. 25, 2003  (JP)  ............................. 2003-081681

(51) Int. Cl.
G11B 33/02 (2006.01)
G11B 17/03 (2006.01)
G11B 17/04 (2006.01)

(52) U.S. Cl. ..................................... 720/608; 720/601
(58) Field of Classification Search ......... 720/601–608
See application file for complete search history.

(56) References Cited

U.S. PATENT DOCUMENTS 5,434,839 A * 7/1995 Choi ........................ 720/607
5,504,729 A * 4/1996 Ikedo et al. ................ 720/614
6,335,914 B2 * 1/2002 Tanaka et al. .............. 720/608
6,339,575 B1 * 1/2002 Suzuki ...................... 720/607
6,728,190 B2 * 4/2004 Huang et al. ............... 720/662
6,918,127 B2 * 7/2005 Maeda et al. .............. 720/620
6,941,563 B2 * 9/2005 Kagawa ..................... 720/608
7,017,166 B2 * 3/2006 Kagawa ..................... 720/608

FOREIGN PATENT DOCUMENTS

JP   2000-011511   1/2000
JP   2000-339877   12/2000

* cited by examiner

*Primary Examiner*—Angel Castro
*Assistant Examiner*—Christopher R. Magee
(74) *Attorney, Agent, or Firm*—Crowell & Moring LLP (57) ABSTRACT

A tray drive mechanism has a simple structure, and yet both an optical disc clamping operation and a tray opening and closing operation can be driven by one feed motor.

The tray drive mechanism comprises: a feed gear and a tray drive gear that are rotated by a feed motor; a rack member to mesh with the feed gear so as to be driven in direction to inner circumference of the optical disc; a plate trigger driven by the rack member so as to slide; and a cam slider to slide in linkage with the plate trigger. When the cam slider is slided in linkage with plate trigger so as to be driven in direction by the tray drive gear meshing with a rack, a boss of the cam slider pushes a slope portion of each of cam grooves and provided in a tray, so that the tray slides to cause a rack of the tray to mesh with the tray drive gear. Thus, the tray is opened and closed by the feed motor.

10 Claims, 7 Drawing Sheets

TRAY DEVICE MECHANISM FOR OPTICAL DISC APPARATUS

BACKGROUND OF THE INVENTION

1. Field of the Invention

The present invention relates to a tray drive mechanism for an optical disc apparatus.

2. Description of the Related Art

Conventionally, tray drive mechanisms designed to reduce manufacturing costs of optical disc apparatus are known in which a disc clamping operation and a tray opening and closing operation are driven by a feed motor for feeding an optical pickup in a radial direction of an optical disc. (Refer, for example, to Japanese Laid-open Patent Publications 2000-11511 and 2000-339877.)

According to the tray drive mechanism disclosed in the Japanese Laid-open Patent Publication 2000-11511, a switch lever is rotated by a rack provided at one end of an optical pickup, and this rotation of the switch lever causes a slide member to slide. This sliding movement of the slide member causes a boss provided on the slide member to push a cam groove provided on the tray, whereby the tray slightly slides in a direction to open. This sliding movement of the tray causes a rack provided on a rear face of the tray to mesh with a gear receiving a driving force transferred from a feed motor, whereby the tray is opened.

According to the tray drive mechanism disclosed in the above-referred Japanese Laid-open Patent Publication 2000-339877, a plate member which connects and supports plural gears for transferring the output of a feed motor is slided in order to transfer the output of the feed motor to either an optical pickup or a gear for opening and closing a tray. For feeding the optical pickup, a lead screw with which the optical pickup is engaged is rotated by the output of the feed motor transferred by the above-described gear.

However, the tray drive mechanism according to the above Japanese Laid-open Patent Publication 2000-11511 has drawbacks in that it requires, e.g., the switch lever to be rotated by the rack provided on the optical pickup, and the slide member to be slided by the rotation of the switch lever. This results in a complicated structure and higher, rather than lower, manufacturing cost of the optical disc apparatus. Furthermore, it is required therein to provide, at one end of the optical pickup, a rack for rotating the switch lever, so that the optical pickup cannot be reduced in size.

Likewise, the tray drive mechanism according to the above Japanese Laid-open Patent Publication 2000-339877 has drawbacks in that it requires, e.g., the plate member and the driving mechanism for driving the plate member, resulting in a complicated structure and higher, rather than lower, manufacturing cost of the optical disc apparatus. In addition, an additional cost is needed to manufacture the lead screw for feeding the optical pickup, so that the manufacturing cost of the optical disc apparatus cannot be reduced.

SUMMARY OF THE INVENTION

An object of the present invention is to provide such a tray drive mechanism that it has a simple structure, and yet the optical disc clamping operation and the tray opening and closing operation can be driven by a feed motor, thereby making it possible to reduce manufacturing cost of optical disc apparatus.

A first aspect of the present invention provides a tray drive mechanism for an optical disc apparatus, comprising: a base chassis; a tray for placing an optical disc therein and loading the optical disc into an optical disc apparatus, the tray being provided and slidable in the optical disc apparatus to open and close, and having a rack to be provided with a driving force for the opening and closing; an optical pickup to irradiate a laser beam onto the optical disc for recording and/or reproducing signals or data; a feed motor for feeding the optical pickup in a radial direction of the optical pickup; a gear train to be driven by the feed motor to rotate and comprising plural gears which include a feed gear to mesh with a rack provided on the optical pickup for feeding the optical pickup and also include a tray drive gear to mesh with the rack of the tray for opening and closing the tray; a drive mechanism chassis having mounted thereon the optical pickup, the feed motor, the feed gear and a switching mechanism for switching operation from a feeding operation of the optical pickup to a clamping and unclamping operation of the optical disc; a rack member comprising a boss and being provided to mesh with the feed gear and driven in a direction to inner circumference of the optical disc; a plate member comprising a boss and a cam groove comprising a slope portion, the boss of the rack member being provided to transfer a driving force to the plate member, wherein the slope portion of the cam groove of the plate member meshes with the boss of the rack member when the rack member is driven in the direction to the inner circumference of the optical disc; and a cam slider slidably supported by the base chassis of the optical disc apparatus, the boss of the plate member being provided to transfer a driving force to the cam slider, wherein the cam slider comprises a cam groove to guide the boss of the plate member for raising and lowering the drive mechanism chassis so as to clamp and unclamp the optical disc, and comprises a boss to guide the tray, and also comprises a rack to mesh with the tray drive gear, wherein the tray comprises a cam groove comprising a slope surface to be engaged with the boss of the cam slider for moving the tray in a direction to open and close the tray when the cam slider is slided, wherein when the rack member is driven in a direction to the inner circumference of the optical disc, the cam slider is slided in linkage with the plate member to cause the rack of the cam slider to mesh with the tray drive gear, and wherein the mesh between the rack of the cam slider and the tray drive gear causes driving of the cam slider to be switched from driving by the plate member to driving by the tray drive gear so that the boss of the cam slider pushes the slope surface of the cam groove for sliding the tray to cause the rack of the tray to mesh with the tray dive gear, whereby the tray is driven by the feed motor to open and close.

By such a configuration, the output of a feed motor is transferred to a tray in a tray opening and closing operation, using an arrangement comprising a rack member, a plate member and a cam slider that are needed for clamping an optical disc. Thus, the clamping operation of the optical disc as well as the tray opening and closing operation can be performed by the feed motor without adding additional components, whereby the manufacturing cost of an optical disc apparatus can be reduced.

According to a second aspect of the present invention, a gear train is used which includes gears matched in phase with each other in assembly. Thus, sliding movement of the cam slider can be synchronized with rotation of a tray drive gear. Accordingly, tooth tip interference between the rack of the cam slider and the tray drive gear can be avoided, thereby preventing tooth tip damage and tooth jump in both teeth of the rack and the tray drive gear.

According to a third aspect of the present invention, in the tray opening operation, the movement of the rack member in the feed direction is restricted due to the engagement between the boss of the rack member and the boss restricting portion. Thus, tooth tip interference between the rack member and the feed gear can be prevented, thereby preventing tooth tip damage and tooth jump in both teeth of the rack member and the feed gear.

According to a fourth aspect of the present invention, the movement of the rack member in the feed direction is restricted due to the engagement between a boss of the rack member and a boss restricting portion of a plate member. Furthermore, the optical pickup is biased by the bias of a spring member in the direction to an inner circumference thereof relative to the rack member. Accordingly, the optical pickup is held at its innermost circumference position. Thus, tooth tip interference between the rack of the optical pickup and a feed gear can be avoided, thereby preventing tooth tip damage and tooth jump in both teeth of the rack and the feed gear.

According to a fifth aspect of the present invention, the movement of the optical pickup in the feed direction is restricted due to a contact between a portion of the rack member and a stopper portion. Thus, even when a significant shock is applied to the optical disc apparatus in the tray-open state, tooth slippage between the rack of the optical pickup and the feed gear can be prevented.

According to a sixth aspect of the present invention, completion of the tray closing operation can be detected by switching off of an innermost position detection switch for detecting the innermost circumference position of the optical pickup. Thus, the structure of the optical disc apparatus becomes simple, and the manufacturing cost of the apparatus can be reduced.

According to a seventh aspect of the present invention, a stopper rib is engaged with a plate spring portion of the plate member so as to restrict the sliding movement of the plate member. Accordingly, the rack member, which has a boss to be engaged with the cam groove of the plate member, is restricted in its movement in the feed direction. Thus, tooth tip interference between the rack member and the feed gear can be avoided, thereby preventing tooth tip damage and tooth jump in both teeth of the rack member and the feed gear.

According to an eighth aspect of the present invention, the plate member has provided thereon a wall portion to contact the boss of the rack member for restricting the sliding movement of the plate member. Accordingly, the movement of the plate member is restricted when the power supply of the optical disc apparatus is off, and the optical pickup is positioned at the inner circumference stop position. Thus, even when the apparatus is subjected to vibration or the like during transportation, possibility of position slippage of the plate member is prevented.

According to a ninth aspect of the present invention, in e.g. the recording operation on the optical disc, the plate spring portion rides on and contacts the stopper rib, whereby a friction force is generated between the plate spring portion and the stopper rib. Thus, the movement of the plate member is prevented, so that the plate member can be locked at a proper position.

According to a tenth aspect of the present invention, the plate member has a gear fall-off prevention plate provided at an end thereof. Thus, with a simple structure, the gears can be prevented from falling off the drive mechanism chassis, whereby the manufacturing cost of the apparatus can be reduced.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 3($a$) and FIG. 3($b$) are schematic plan views of the tray drive mechanism, showing a state at the time of recording and reproduction operation and a state at the time of starting tray opening operation, respectively;

FIG. 5($a$) is a schematic cross-sectional side view of the tray drive mechanism, showing its structure, when the tray is closed, while FIG. 5($b$) is a schematic side view of the same mechanism as seen in the direction of arrow X in FIG. 5($a$);

FIG. 6($a$) is a schematic plan view of a drive mechanism chassis in the initial state, while FIG. 6($b$) is a schematic partially enlarged view of a plate trigger mounted on the same chassis; and FIG. 7($a$) is a schematic plan view of the drive mechanism chassis in the middle of the tray opening operation, while FIG. 7($b$) is a schematic partially enlarged view of the plate trigger mounted on the same chassis.

DESCRIPTION OF THE PREFERRED EMBODIMENTS

An optical disc apparatus comprising a tray drive mechanism according to an embodiment of the present invention will be described hereinafter with reference to the drawings.

Figure 1:
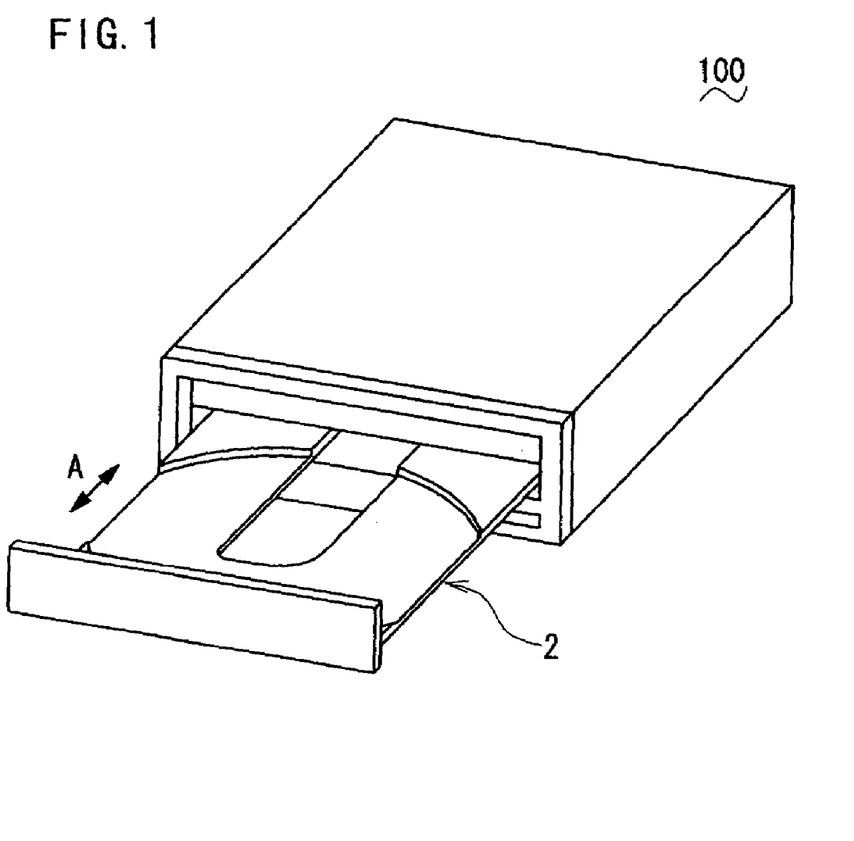
FIG. 1 is a schematic oblique view, showing appearance, of an optical disc apparatus comprising a tray drive mechanism according to an embodiment of the present invention.

FIG. 1 shows appearance of an optical disc apparatus 100. The optical disc apparatus 100 is such an apparatus that an optical disc placed in a tray 2 is loaded into the apparatus, and signals or data are recorded and/or reproduced by irradiating a laser beam onto the loaded optical disc. For loading and unloading the optical disc, the tray 2 having the optical disc placed therein is driven by a tray drive mechanism so as to slide in an opening and closing direction A.

Figure 2:
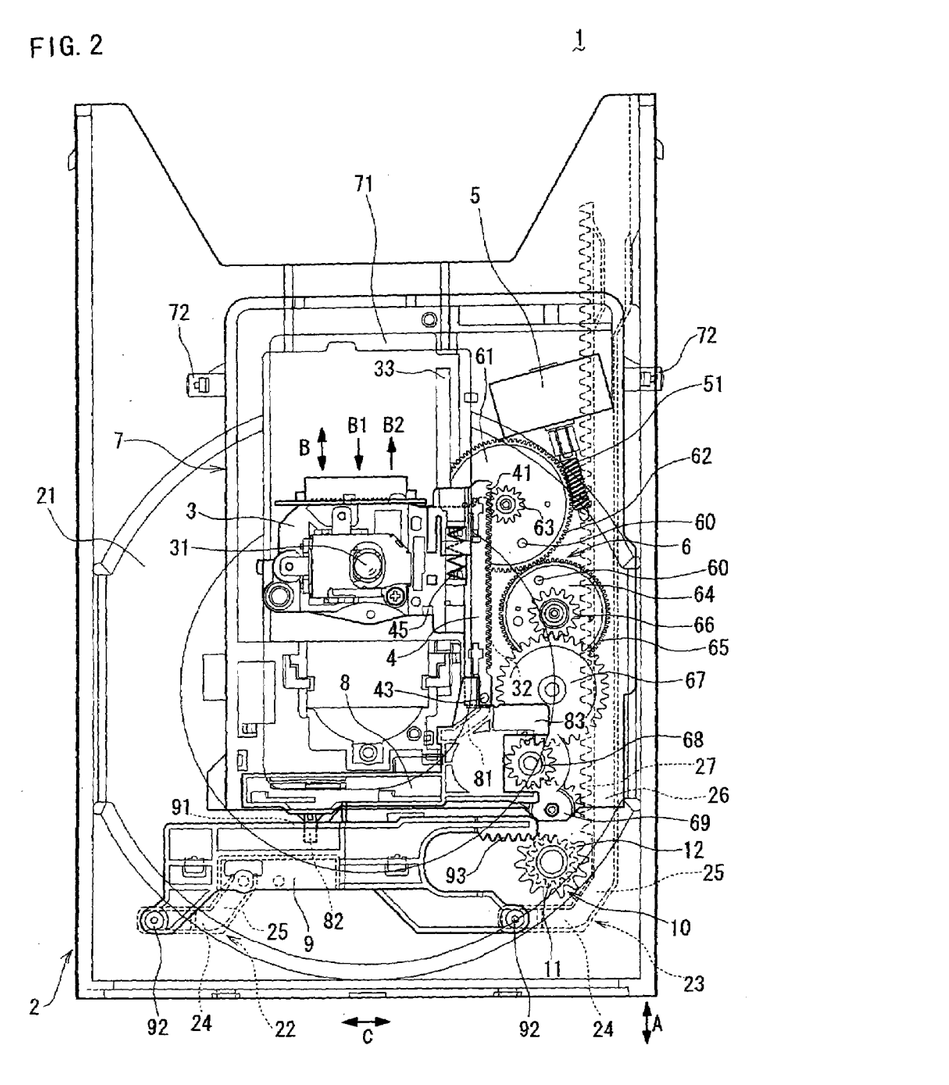
FIG. 2 is a schematic plan view of the tray drive mechanism in an initial state (power supply off-state)

FIG. 2 shows a tray drive mechanism 1 in an initial state (power supply off-state). The tray drive mechanism 1 is such a mechanism that the tray 2 is driven to open and close by a feed motor 5 for feeding an optical pickup 3. The tray drive mechanism 1 comprises: the optical pickup 3 to irradiate a laser beam onto an optical disc for recording and/or reproducing signals or data; the feed motor 5; a gear train 6 comprising plural gears such as a feed gear 61 to be rotated by the feed motor 5 for driving and feeding the optical pickup 5; a drive mechanism chassis 7 for mounting thereon the optical pickup 3, the feed motor 5, the feed gear 61, a turntable (not shown) for rotating the optical disc, and the like; a plate trigger (plate member) 8 and a cam slider 9 to raise and lower the drive mechanism chassis 7 for clamping and unclamping an optical disc; and so on. The optical pickup 3, the feed motor 5, the gear train 6, the drive mechanism chassis 7, the plate trigger 8 and the cam slider 9 are placed below the tray 2.

The tray 2 has, at an upper face thereof, a recess 21 for placing an optical disc. At a lower face thereof, the tray 2 is provided with a pair of cam grooves 22 and 23 to be engaged with a boss 92 of the cam slider 9 and also provided with a rack 27 to mesh with a tray drive gear 10. The cam groove 22 comprises: a perpendicular portion 24 to extend in a direction of arrow C which is perpendicular to the tray opening and closing direction A; and a slope portion 25 for moving the tray 2 in the opening and closing direction A by being pushed by the boss 92 when the cam slider 9 slides in the direction of arrow C. The cam groove 23 comprises: a perpendicular portion 24; a slope portion 25; and an opening and closing guide portion 26 extending from an end of the slope portion 25 toward a back end of the tray 2.

The optical pickup 3 comprises: a semiconductor laser for emitting a laser beam; an objective lens 31 for focusing the laser beam onto a recording surface of the optical disc; a photodetector for receiving a laser beam reflected from the optical disc; a rack 32 to mesh with the feed gear 61; and so on. The optical pickup 3 is guided by a guide shaft 33 and driven by the feed gear 61 (upper gear 63), and is thereby fed in a radial direction (feed direction B) of the optical disc. The feed direction B of the optical pickup 3 is identical to the tray opening and closing direction A.

On an upper part of the rack 32 of the optical pickup 3, a rack member 4 for converting the rotational force of the feed gear 61 into a sliding force in the feed direction B and for transferring the sliding force to the plate trigger 8 is mounted so as to be slidable relative to the optical pickup 3 in the feed direction B. The rack member 4 has a rack 41 to be stacked together with the rack 32 and to mesh with the upper gear 63, wherein the rack 32 and the rack 41 constitute a double rack. By a coil spring (spring member) 45 having one end contacted with the optical pickup 3 and another end contacted with the rack member 4, the rack member 4 is biased in a direction B2 to an outer circumference of the optical disc relative to the optical pickup 3, while due to its reaction force, the optical pickup 3 is biased in a direction B1 to an inner circumference thereof. This makes it possible to reduce rattle in the teeth mesh of the feed gear 61 with the rack 32 and the rack 41, and thereby to accurately feed the optical pickup 3. Besides, the rack member 4 has a boss 43 provided at an end thereof for transferring a driving force to the plate trigger 8.

The feed motor 5 has a worm gear 51 provided integrally with an output shaft thereof, so that the output of the feed motor 5 is transferred to the feed gear 61 via the worm gear 51. The feed gear 61 comprises: a lower gear 62 to mesh with the worm gear 51 and the gear 64; and the upper gear 63 to mesh with the rack 32 of the optical pickup 3 and the rack 41 of the rack member 4.

The gear train 6 comprises: the feed gear 61; gears 64, 67, 68 and 69 rotatably supported by the drive mechanism chassis 7; and the tray drive gear 10 rotatably supported by a base chassis of the optical disc apparatus. The gear 64 comprises: a lower gear 65 to mesh with the feed gear 61; and an upper gear 66 to mesh with the gear 67. Each of the feed gear 61 and the gear 64 is marked with phase marks 60 for phase matching, wherein the phase marks 60 of both gears are adjusted to be opposed to each other in assembling both gears 61 and 64 in the drive mechanism chassis 7. The output of the feed motor 5 is transferred to the tray drive gear 10 via the worm gear 51, the feed gear 61 and the gears 64, 67, 68 and 69 in this sequence. The tray drive gear 10 comprises: an upper gear 11 to mesh with a rack 93 of the cam slider 9; and a lower gear 12 to mesh with a rack 27 of the tray 2.

The drive mechanism chassis 7 has mounted thereon the optical pickup 3, the feed motor 5, the feed gear 61, the gears 64, 67, 68 and 69, the turntable and a spindle motor for rotating the turntable. The drive mechanism chassis 7 has an opening 71 to insert and fit the optical pickup 3 as well as a pair of shaft portions 72 to be coupled to the base chassis of the optical disc apparatus 100, and functions as a base (traverse base) for moving (traversing) the optical pickup 3 in the feed direction B.

Each shaft portion 72 is provided at one side end of the drive mechanism chassis 7, and is pivotably supported by a support portion 15 (refer to FIG. 5(a) described later) provided on and protruding from the base chassis of the optical disc apparatus 100. At the other side end of the drive mechanism chassis 7, the plate trigger 8 is mounted to be slidable in the direction of arrow C. The plate trigger 8 is raised and lowered by the cam slider 9 to cause the drive mechanism chassis 7 to pivot about the axis of the shaft portion 72. Thereby, the turntable placed between the shaft portion 72 and the plate trigger 8 is raised and lowered to clamp and unclamp the optical disc.

Figure 3A:
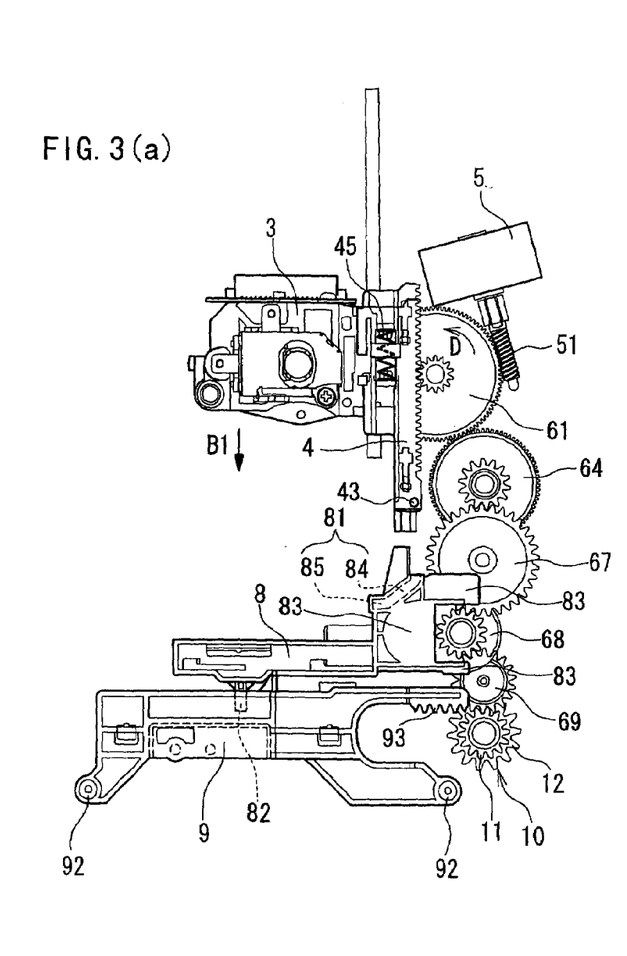
Figure 3B:
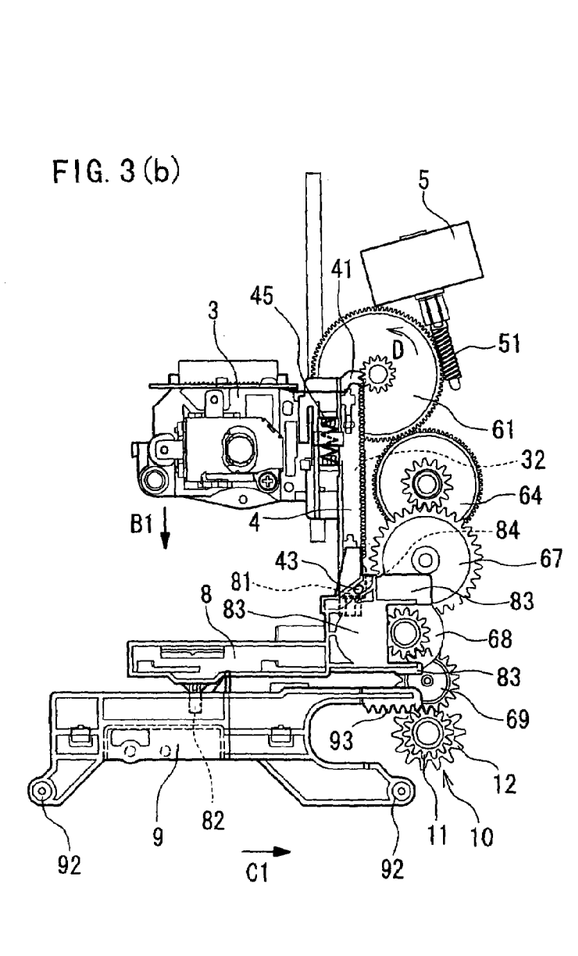

The plate trigger 8 comprises: a cam groove 81 to be engaged with the boss 43 of the rack member 4 when the rack member 4 is driven in the direction B1 to the inner circumference of the optical disc; a boss 82 for transferring a driving force to the cam slider 9; and a gear fall-off prevention plate 83 which is positioned above the gears 67, 68 and 69, and which partially overlaps the gears 67, 68 and 69, as seen in the plan view, to prevent such gears from falling off. The plate trigger 8 is mounted on the drive mechanism chassis 7 so as to slide in the direction of arrow C which is perpendicular to the tray opening and closing direction A. As shown in FIG. 3, the cam groove 81 comprises: a slope portion 84 for changing, by approximately 90 degrees, the direction of the driving force transferred by the boss 43; and a boss restricting portion 85 which extends from an end of the slope portion 84 in the direction of arrow C approximately perpendicular to the feed direction B of the optical pickup 3, and which restricts the movement of the boss 43 in the feed direction B.

The cam slider 9 comprises: a cam groove 91 (refer to FIG. 5) to be engaged with the boss 82 of the plate trigger 8; a pair of bosses 92 to be engaged with the cam grooves 22 and 23 of the tray 2 for guiding the tray 2; and a rack 93 to mesh with the upper gear 11 of the tray drive gear 10. The cam slider 9 is supported by the base chassis of the optical disc apparatus 100 so as to be slidable in the direction of arrow C.

Hereinafter, the operation of opening the tray in the tray drive mechanism as structured above will be described with reference to FIG. 3 and FIG. 4.

FIG. 3(a) and FIG. 3(b) show the tray drive mechanism 1 at the time of recording and reproduction operation and at the time of starting the tray opening operation, respectively, wherein e.g. the tray 2 and the drive mechanism chassis 7 are omitted in the drawings. For recording and reproduction of the optical disc, the optical pickup 3 is fed by the feed gear 61 such that the optical pickup matches the position of recording tracks. At this time, the rack member 4 is also fed together with the optical pickup 3, while the boss 43 is separate from the cam groove 81. Furthermore, the rack 93 of the cam slider 9 is separate from the upper gear 11 of the tray drive gear 10, and also the rack 27 (refer to FIG. 2) of the tray 2 is separate from the lower gear 12 of the tray drive gear 10.

When the recording or reproduction operation ends, the feed gear 61 is rotated in the direction of arrow D, whereby the optical pickup 3 and the rack member 4 are fed in the direction B1 to the inner circumference of the optical disc, returning to the initial state as shown in FIG. 2. The position of the optical pickup at this time is referred to as inner circumference stop position.

When the tray opening operation starts, the feed gear 61 is further rotated in the direction of arrow D as shown in FIG. 3(b), whereby the optical pickup 3 and the rack member 4 are fed in the direction B1 to the inner circumference of the optical disc. Thus, the rack 32 of the optical pickup 3 comes out of mesh with the feed gear 61, while only the rack 41 of the rack member 4 meshes with the feed gear 61. The position of the optical pickup 3 at this time is referred to as innermost circumference position. The rack member 4 is driven in the direction B1 to the inner circumference of the optical disc, and the boss 43 is introduced into the cam groove 81 to push a side surface of the slope portion 84 and slide the plate trigger 8 in the direction of arrow C1.

The boss 82 of the plate trigger 8 is engaged with the cam groove 91 of the cam slider 9, and transfers, to the cam slider 9, the driving force provided by the rack member 4 for sliding movement. Thereby, the cam slider 9 slides in linkage with the plate trigger 8 in the direction of arrow C1. Thus, the rack 93 meshes with the tray drive gear 10, and the cam slider 9 is driven by the plate trigger 8 and the tray drive gear 10.

Figure 4:
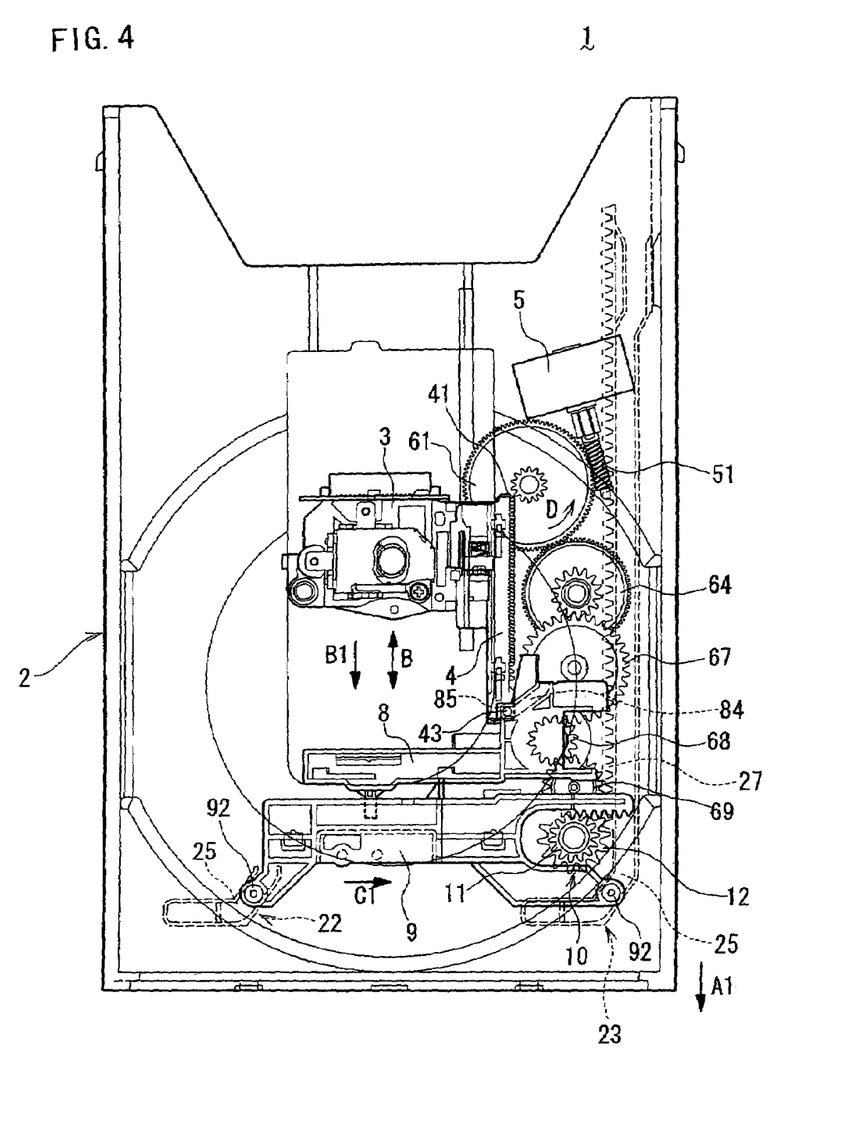
FIG. 4 is a schematic plan view of the tray drive mechanism, showing a state in the middle of the tray opening operation.

When the feed gear 61 is further rotated in the direction of arrow D, a state as shown in FIG. 4 is reached. In FIG. 4, the drive mechanism chassis 7 is omitted in the drawing. FIG. 4 shows the state where the boss 43 has reached the boss restricting portion 85, having passed through the slope portion 84, and the plate trigger 8 has stopped. In the middle of such operation, the rack 41 of the rack member 4 comes out of mesh with the feed gear 61, and the driving of the cam slider 9 is switched from the driving by the plate trigger 8 to the driving by the tray drive gear 10. Furthermore, owing to the boss 43 having reached the boss restricting portion 85, the movement of the rack member 4 in the feed direction B is restricted.

The cam slider 9 driven by the tray drive gear 10 slides in the direction of arrow C1, while the boss 92 passes through the slope portion 25 of the cam grooves 22 and 23 of the tray 2, and at this moment pushes a side surface of the slope portion 25. Thereby, the tray 2 is slided in the open direction A1, and the rack 27 meshes with the lower gear 12 of the tray drive gear 10. Thereafter, the tray 2 is driven by the tray drive gear 10 so as to slide in the open direction A1, and reaches the tray-open state as shown in FIG. 1. At this time, the boss 92 travels along the opening and closing guide portion 26 of the cam groove of the tray 2, and guides the sliding movement of the tray 2.

In contrast to the above, the tray 2 can be closed by rotating the feed motor 5 in a direction opposite to the above-described rotation direction in order to perform an operation reversed from the above-described operation. In such manner, the opening and closing operation of the tray 2 is performed by driving one motor (feed motor 5).

In the following, the operation of unclamping and clamping the optical disc to be performed concurrently with the opening and closing operation of the tray 2 will be described.

The optical disc is unclamped by tilting the drive mechanism chassis 7 when the cam slider 9 is driven by the tray drive gear 10 so as to slide.

Figure 5A:
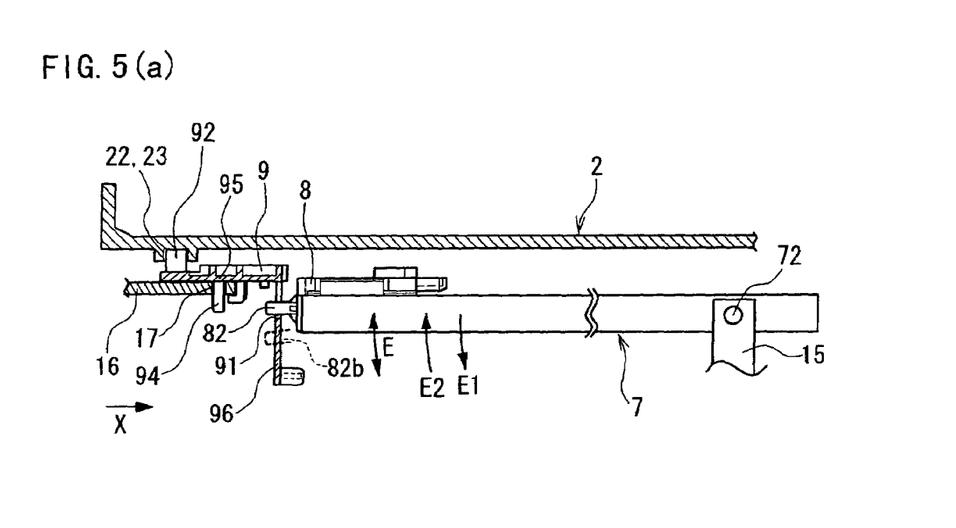
Figure 5B:
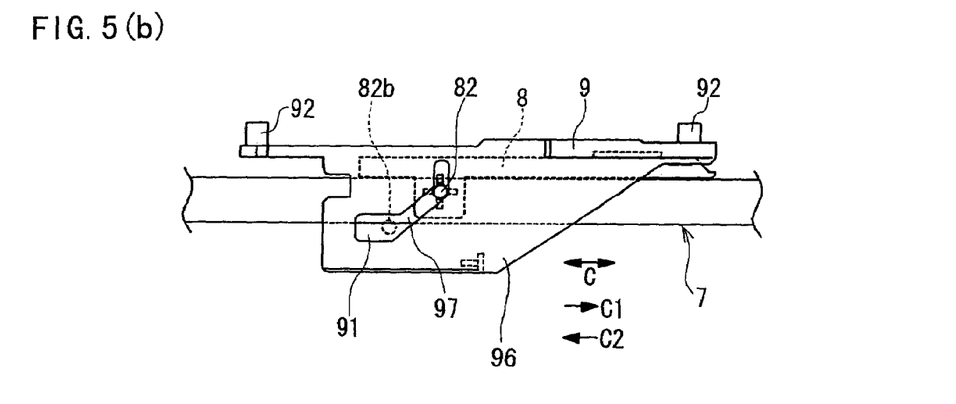

FIG. 5 shows the tray drive mechanism 1 when the tray is closed. As shown in FIG. 5(a), the drive mechanism chassis 7 is mounted on the base chassis of the optical disc apparatus 100 in a manner that each shaft portion 72 provided at one side end of the drive mechanism chassis 7 is supported by a support portion 15 provided and standing on the base chassis of the optical disc apparatus 100. The drive mechanism chassis 7 further pivots about the axis of the shaft portion 72 in a direction of arrow E when the boss 82 of the plate trigger 8 is raised or lowered by being guided by the cam groove 91 of the cam slider 9. Furthermore, a turntable for lifting the optical disc out of the tray 2 and for rotating the optical disc is provided between the shaft portion 72 of the drive mechanism chassis 7 and the plate trigger 8. Thus, when the drive chassis mechanism 7 pivots in a direction of arrow E2, the optical disc is sandwiched between the turntable and a damper placed above the optical disc for magnet clamping (chucking).

The cam slider 9 is mounted on a support portion 16 provided on the base chassis of the optical disc apparatus 100, and comprises: a sliding surface 95 to slide on the support portion 16; and an opposing surface 96 to stand upright on the sliding surface 95 so as to be opposed to the plate trigger 8. The support portion 16 of the base chassis has provided thereon a guide groove 17 for guiding the cam slider 9 when the cam slider 9 slides, while the sliding surface 95 of the cam slider 9 has provided thereon a protrusion portion 94 to be engaged with the guide groove 17.

The opposing surface 96 of the cam slider 9 has provided thereon a cam groove 91 having a slope portion 97 as shown in FIG. 5(b). The boss 82 of the plate trigger 8 is engaged with the cam groove 91, and is guided by the slope portion 97 so as to be raised or lowered when the cam slider 9 is slided in the direction C.

When the driving of the cam slider 9 is switched from the driving by the plate trigger 8 to the driving by the tray drive gear 10 (refer to FIG. 4), the cam slider 9 is driven by the tray drive gear 10 so as to slide in the direction of arrow C1. Then, the boss 82 is guided by the slope portion 97 so as to be lowered, whereby the drive mechanism chassis 7 pivots in the direction of arrow E1 so as to become tilted. Thereby, the turntable is lowered, and the optical disc becomes unclamped.

The unclamping operation described above is performed by rotating the feed motor 5 in one direction.

In contrast to the above, the optical disc can be clamped by rotating the feed motor 5 in a direction opposite to the above-described one direction of rotation in order to perform an operation reversed from the above-described unclamping operation. The position of the boss 82 of the plate trigger 8 in the tray-open state is shown by reference numeral 82b. When the feed motor 5 is rotated in such opposite direction, the cam slider 9 is slided in the direction of arrow C2, whereby the boss 82 is guided by the slope portion 97 so as to be raised. This causes the drive mechanism chassis 7 to pivot in the direction of arrow E2. Thereby, the turntable is raised to lift the optical disc, and the optical disc becomes sandwiched and clamped between the turntable and the clamper. In such manner, the unclamping and clamping operation of the optical disc is performed by the driving force of the feed motor 5.

Figure 6A:
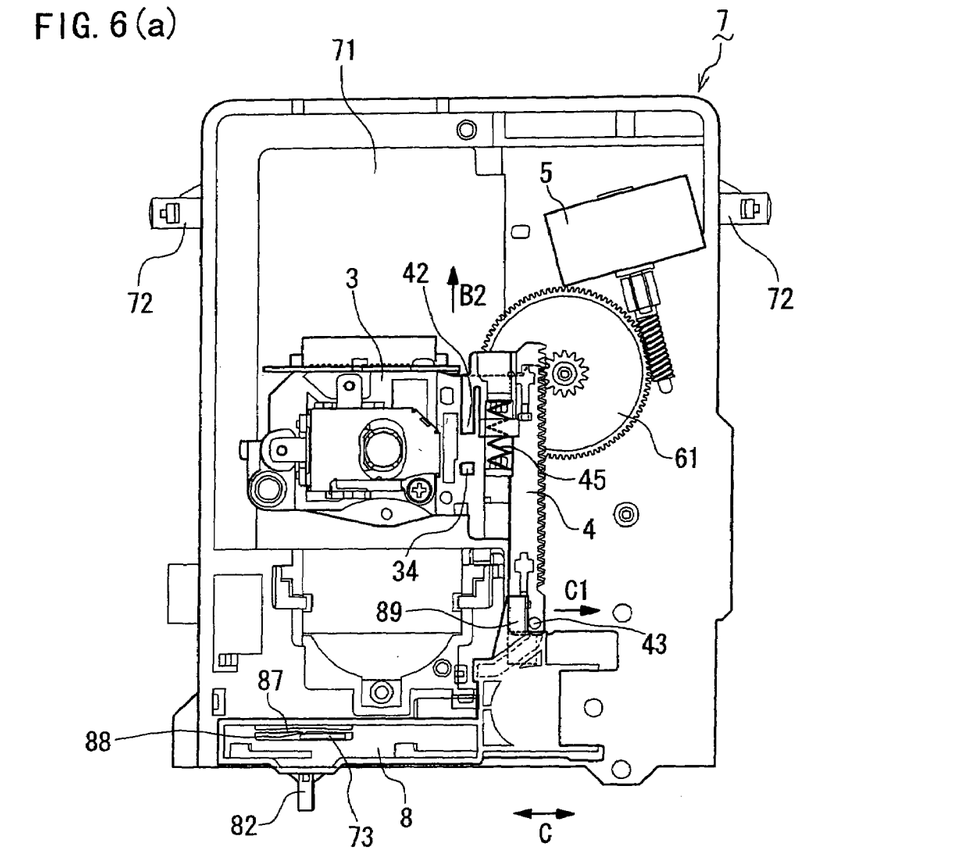

FIG. 6 is a plan view of the drive mechanism chassis 7 in the initial state, wherein the gears 64, 67, 68 and 69 are omitted in the drawing. A circuit board (not shown) for controlling the spindle motor is provided below the opening 71 of the drive mechanism chassis 7. On this circuit board, an innermost position detection switch for detecting an innermost circumference position of the optical pickup 3 is mounted at a position corresponding to the innermost circumference position of the optical pickup 3. This innermost circumference position of the optical pickup 3 is a reference position of the optical pickup 3 in feeding the optical pickup 3.

Figure 6B:
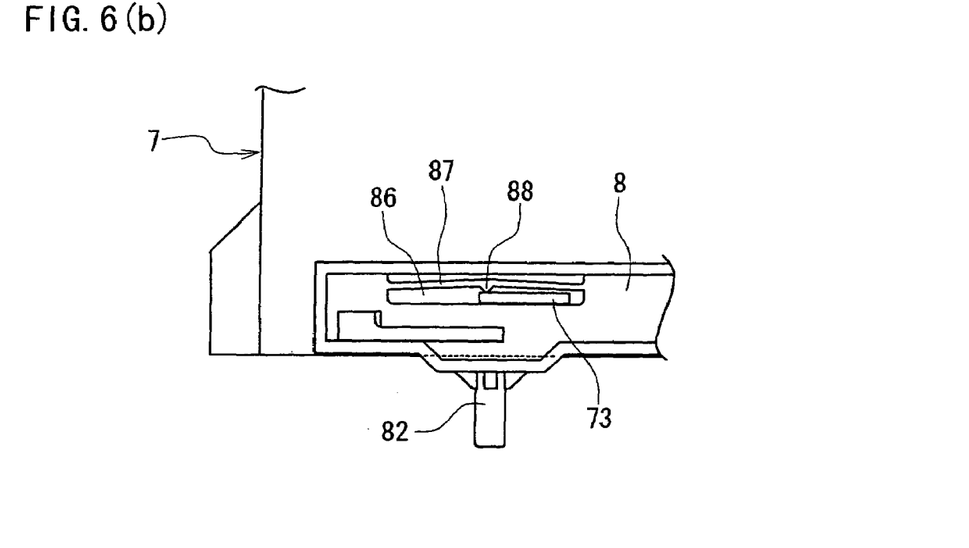

The drive mechanism chassis 7 has provided thereon a stopper rib 73 for restricting the sliding movement of the plate trigger 8, while the plate trigger 8 has provided thereon an opening 86 to avoid interference with this stopper rib 73. A plate spring portion 87 which can be elastically deformed in a direction (direction B2) perpendicular to the direction of arrow C is provided to bridge both ends of the opening 86. The plate spring portion 87 has, at an approximately center thereof, a protrusion portion 88 (refer to FIG. 6(b) in particular) which protrudes to the track of the stopper rib 73 so as to be engaged with the stopper rib 73.

The plate trigger 8 furthermore has provided thereon a rib-like wall portion 89 to contact the boss 43 of the rack member 4 for restricting sliding movement of the plate trigger 8 in the direction of arrow C1 when the optical pickup 3 is positioned at the inner circumference stop position in its initial state. The rack member 4 has provided thereon a plate spring-shaped protrusion portion 42 positioned in the vicinity of the coil spring 45, while the optical pickup 3 has provided thereon a stopper portion 34 to contact the protrusion portion 42 for restricting the movement of the optical pickup 3 in the feed direction B2 when the optical pickup 3 is positioned at its innermost circumference position.

In the initial state, the protrusion portion 88 rides on and is in contact with the stopper rib 73 as shown in FIG. 6. When the state is shifted from the initial state to the recording or reproduction operation or the seek operation of the optical disc, then the optical pickup 3 and the rack member 4 are driven in the feed direction B2 by the feed gear 61. However, the position of the plate trigger 8 is unchanged, maintaining the condition where the protrusion potion 88 rides on and is in contact with the stopper rib 73. This contact between the protrusion 88 and the stopper rib 73 causes a load to be applied to the plate spring portion 87, and generates a friction force between the protrusion portion 88 and the stopper rib 73 for preventing the plate trigger 8 from sliding.

Figure 7A:
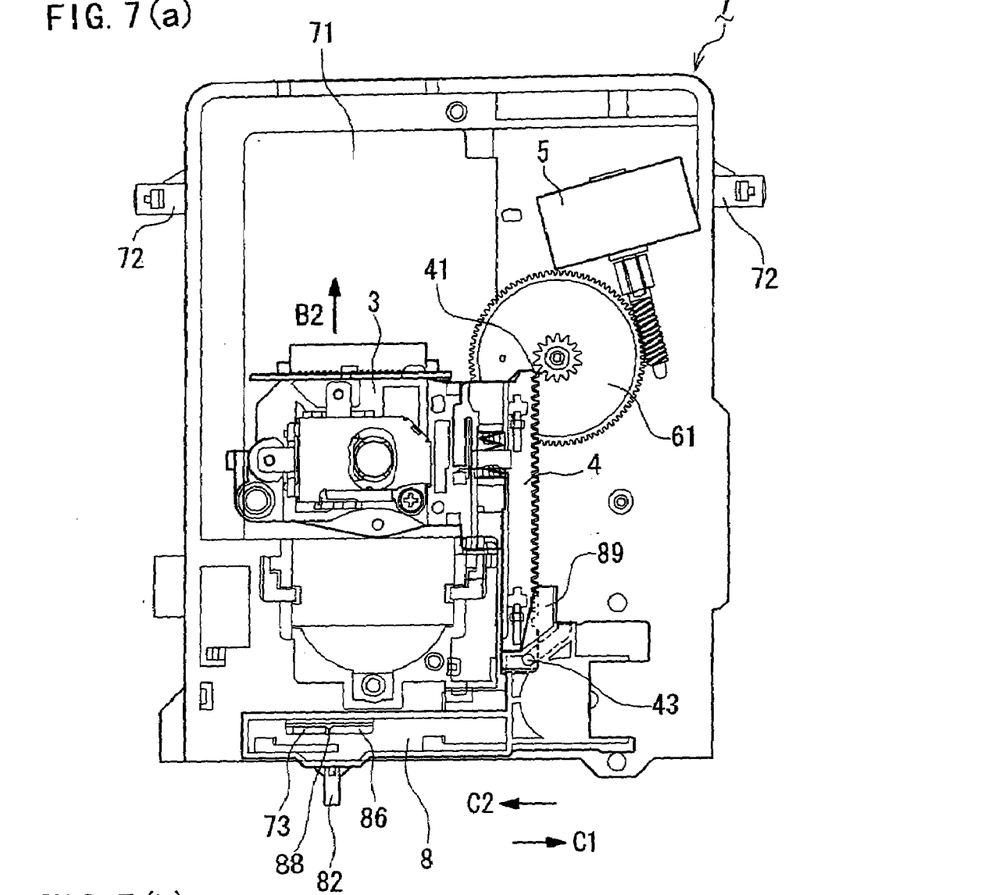

FIG. 7 is a plan view of the drive mechanism chassis 7 in the middle of the tray opening operation after the rack member 4 is separated from the feed gear 61, wherein the gears 64, 67, 68 and 69 are omitted in the drawing. In this state, the protrusion portion 88 of the plate spring portion 87 having ridden on the stopper rib 73 in FIG. 6 moves in the direction C1 when the plate trigger 8 is slided. The protrusion portion 88 then passes over the stopper rib 73 so as to be engaged with an end portion of the stopper rib 73. This engagement between the protrusion portion 88 and the stopper rib 73 restricts the sliding movement of the plate trigger 8 in the direction of arrow C2, and prevents the sliding movement of the rack member 4 in the feed direction B2, thereby preventing the rack 41 of the rack member 4 from contacting the feed gear 61.

According to the tray drive mechanism 1 as described hereinabove, one feed motor 5 makes it possible to feed the optical pickup 3, clamp the optical disc, and open and close the tray 2. Thus, the manufacturing cost of the optical disc apparatus 100 can be reduced. Moreover, the rack member 4, the plate trigger 8 and the cam slider 9 that are needed to open and close the tray 2 are components used for the clamping operation. Accordingly, it is not necessary to add new components for opening and closing the tray 2, so that the structure of the apparatus does not become unnecessarily complicated.

Besides, since the feed gear 61 and the gear 64 among the gears constituting the gear train 6 are matched in phase in assembly, the sliding movement of the cam slider 9 can be synchronized with the rotation of the tray drive gear 10. Accordingly, tooth tip interference between the rack 93 of the cam slider 9 and the tray drive gear 10 can be avoided, thereby preventing tooth tip damage and tooth jump in both teeth of the rack 93 and the tray drive gear.

In the tray opening operation, the movement of the rack member 4 in the feed direction B2 is restricted due to the engagement between the boss 43 of the rack member 4 and the boss restricting portion 85 of the plate trigger 8. Accordingly, tooth tip interference between the rack member 4 and the feed gear 61 can be prevented, thereby preventing tooth tip damage and tooth jump in both teeth of the rack member 4 and the feed gear 61. Furthermore, in this state, the optical pickup 3 is biased by the bias of the spring member 45 in the direction B1 to an inner circumference thereof relative to the rack member 4. Accordingly, the optical pickup 3 is held at its innermost circumference position, and tooth tip interference between the rack 32 of the optical pickup 3 and the feed gear 61 can be avoided, thereby preventing tooth tip damage and tooth jump in both teeth of the rack 32 and the feed gear 61.

In addition, the optical pickup 3 comprises the stopper portion 34 to contact the protrusion portion 42 of the rack member 4. This contact between the protrusion portion 42 and the stopper portion 34 restricts the movement of the optical pickup 3 in the feed direction B2. Thus, even when a significant shock is applied to the optical disc apparatus 100 in the tray opening operation, tooth tip interference between the rack 32 of the optical pickup 3 and the feed gear 61 can be avoided, thereby preventing tooth tip damage and tooth jump in both teeth of the rack 32 and the feed gear 61.

Completion of the tray closing operation can be detected by switching off of the innermost position detection switch for detecting the innermost circumference position of the optical pickup 3, the innermost position detection switching being mounted on the circuit board provided below the drive mechanism chassis 7. Accordingly, the structure of the optical disc apparatus 100 becomes simple, and the manufacturing cost of the apparatus can be reduced.

In the tray opening operation, furthermore, the stopper rib 73 is engaged with the protrusion portion 88 of the plate spring portion 87 of the plate trigger 8 so as to restrict the sliding movement of the plate trigger 8. Accordingly, the rack member 4, which has the boss 43 to be engaged with the cam groove 81 of the plate trigger 8, is restricted in its movement in the feed direction B2. Thus, tooth tip interference between the rack member 4 and the feed gear 61 can be avoided, thereby preventing tooth tip damage and tooth jump in both teeth of the rack member 4 and the feed gear 61.

Furthermore, the plate trigger 8 has provided thereon the wall portion 89 to contact the boss 43 of the rack member 4 for restricting the sliding movement of the plate trigger 8. Accordingly, the movement of the plate trigger 8 is restricted when the power supply of the optical disc apparatus 100 is off, and the optical pickup 3 is positioned at the inner circumference stop position. Thus, even when the apparatus is subjected to vibration during transportation, position slippage of the plate trigger 8 is prevented.

In e.g. the recording operation on the optical disc, the protrusion portion 88 of the plate spring portion 87 of the plate trigger 8 rides on and contacts the stopper rib 73, whereby a friction force is generated between the protrusion portion 88 and the stopper rib 73. Thus, the movement of the plate trigger 8 is prevented, so that the plate trigger 8 can stay at a proper standby position even when the optical disc apparatus 100 is subjected to vibration, shock or the like.

Furthermore, the plate trigger 8 has, at an end thereof, a gear fall-off prevention plate 83 which, as seen in the plan view, partially overlaps the gears 67, 68 and 69 that constitute the gear train 6. Accordingly, it becomes unnecessary to mount, on the rotation shaft of each gear, a ring or the like to prevent each such gear from falling off. Thus, with a simple structure, the gears can be prevented from falling off the drive mechanism chassis 7, whereby the manufacturing cost of the apparatus can be reduced.

Figure 7B:
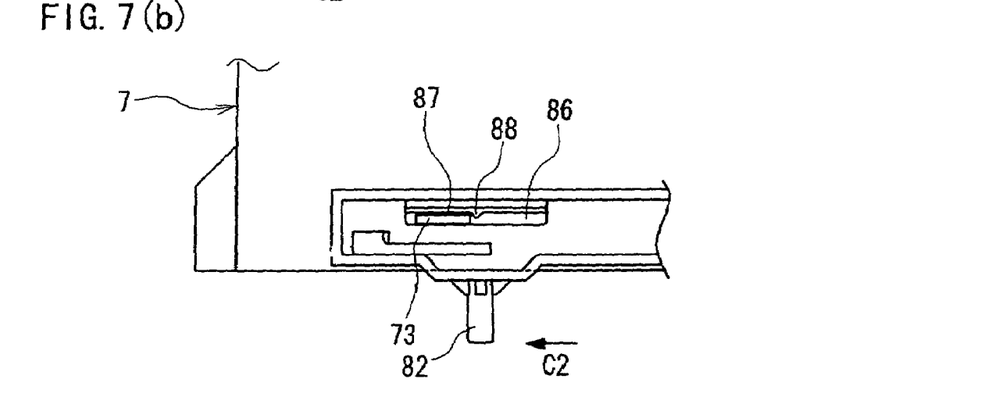

It is to be noted that the present invention is not limited to the above-described specific embodiment, and various modifications are possible. For example, the moving direction of the plate trigger 8 and the cam slider 9 is not limited to the direction C which is approximately perpendicular to the tray opening and closing direction A. It can be any direction as long as thereby the drive mechanism chassis 7 is tilted for unclamping the optical disc at the time of starting the tray opening operation, and as long as the tray 2 is moved so that the rack 27 of the tray 2 meshes with the tray drive gear 10. From this follows that the cam groove 81 of the plate trigger 8, the cam groove 91 of the cam slider 9 and the cam grooves 22 and 23 of the tray 2 are not limited to such structures as shown in FIG. 2 to FIG. 5. Each of them can be any structure as long as the sliding force of the rack member 4 can be appropriately transferred by force direction change. Besides, the structure of the plate spring portion 87 is not limited to such as shown in FIG. 6 and FIG. 7. It can be any structure as long as the plate spring portion 87 can be contacted and engaged with the stopper rib 73.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A tray drive mechanism for an optical disc apparatus, comprising:
    a base chassis;
    a tray for loading an optical disc into the optical disc apparatus, the tray configured to move between an open position external to the optical disc apparatus and close position internal to the optical disc apparatus, and the tray having a rack provided with a driving force for moving the tray;
    an optical pickup to irradiate a laser beam onto the optical disc for recording and reproducing information;
    a feed motor for feeding the optical pickup in a radial direction of the optical pickup;
    a gear train driven by the feed motor to rotate the gear train comprising a feed gear to mesh with a rack provided on the optical pickup for feeding the optical pickup and a tray drive gear to mesh with the rack of the tray for moving the tray between the open and close positions;
    a drive mechanism chassis having mounted thereon the optical pickup, the feed motor, the feed gear and a switching mechanism for switching operation from a feeding operation of the optical pickup to a clamping and unclamping operation of the optical disc;
    a rack member comprising a boss and being provided to mesh with the feed gear and driven toward an inner circumference of the optical disc;
    a plate member comprising a boss and a cam groove, the boss of the rack member being provided to transfer a driving force to the plate member, wherein a slope portion of the cam groove of the plate member meshes with the boss of the rack member when the rack member is driven toward the inner circumference of the optical disc; and
    a cam slider slidably supported by the base chassis of the optical disc apparatus, the boss of the plate member being provided to transfer a driving force to the cam slider, wherein the cam slider comprises a cam groove to guide the boss of the plate member for raising and lowering the drive mechanism chassis so as to clamp and unclamp the optical disc, a boss to guide the tray, and a rack to mesh with the tray drive gear,
    wherein the tray comprises a cam groove comprising a slope surface to be engaged with the boss of the cam slider for moving the tray between the open and close positions when the cam slider slides,
    wherein when the rack member is driven toward the inner circumference of the optical disc, the cam slider slides in linkage with the plate member to cause the rack of the cam slider to mesh with the tray drive gear, and
    wherein the mesh between the rack of the cam slider and the tray drive gear causes the cam slider to be driven by the tray drive gear, instead of the plate member, so that the boss of the cam slider pushes the slope surface of the cam groove for sliding the tray to cause the rack of the tray to mesh with the tray dive gear, whereby the tray is driven by the feed motor to the open and close positions.

2. The tray drive mechanism for an optical disc apparatus according to claim 1, wherein the gear train includes gears which are matched in phase with each other in assembly.

3. The tray drive mechanism for an optical disc apparatus according to claim 1, wherein the plate member further comprises, at the cam groove thereof, a boss restricting portion which extends in a direction approximately perpendicular to the feed direction of the optical pickup, and which restricts movement of the boss of the rack member in the feed direction in tray opening operation.

4. The tray drive mechanism for an optical disc apparatus according to claim 3, wherein the optical pickup is biased by a spring member having one end contacted with the optical pickup and another end contacted with the rack member in the direction of the inner circumference of the optical disc.

5. The tray drive mechanism for an optical disc apparatus according to claim 3, wherein the optical pickup further comprises a stopper portion to contact a portion of the rack member for restricting movement of the optical pickup in the feed direction when the optical pickup is positioned at an innermost circumference position thereof.

6. The tray drive mechanism for an optical disc apparatus according to claim 1, which further comprises an innermost position detection switch for detecting an innermost circumference position of the optical pickup, wherein completion of a tray closing operation is detected by switching off of the innermost position detection switch.

7. The tray drive mechanism for an optical disc apparatus according to claim 1, wherein the plate member further comprises a plate spring portion which can be elastically deformed in a direction perpendicular to a sliding direction of the plate member, and wherein the drive mechanism chassis further comprises a stopper rib to be engaged with the plate spring portion for restricting sliding movement of the plate member after the rack member is driven by the feed gear toward the inner circumference of the optical disc so as to be separated from the feed gear.

8. The tray drive mechanism for an optical disc apparatus according to claim 1, wherein the plate member further comprises a rib-like wall portion to contact the boss of the rack member for restricting sliding movement of the plate member when the optical pickup is positioned at an inner circumference stop position in power supply off-state.

9. The tray drive mechanism for an optical disc apparatus according to claim 1, wherein the plate member further comprises a plate spring portion which can be elastically deformed in a direction perpendicular to a sliding direction of the plate member, and wherein the drive mechanism chassis further comprises a stopper rib for the plate spring portion to ride on and contact in a recording and reproducing operation or a seek operation of the optical disc, thereby preventing the plate member from moving in the recording and reproducing operation or the seek operation.

10. The tray drive mechanism for an optical disc apparatus according to claim 1, wherein the plate member further a gear fall-off prevention plate that is positioned above gears constituting the gear train, and that partially overlaps the gears, to prevent the gears from falling from the drive mechanism chassis.

* * * * *